Patented July 4, 1950

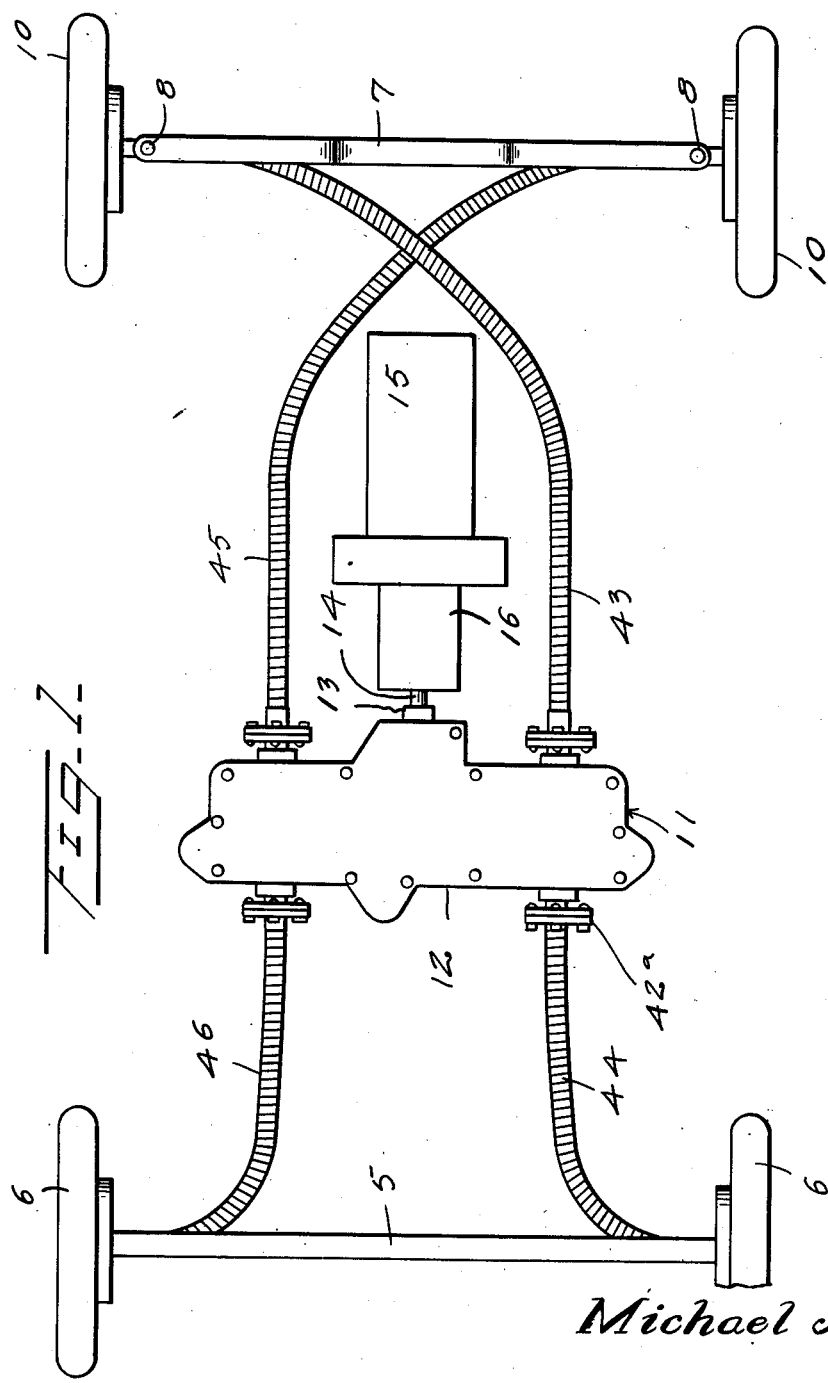

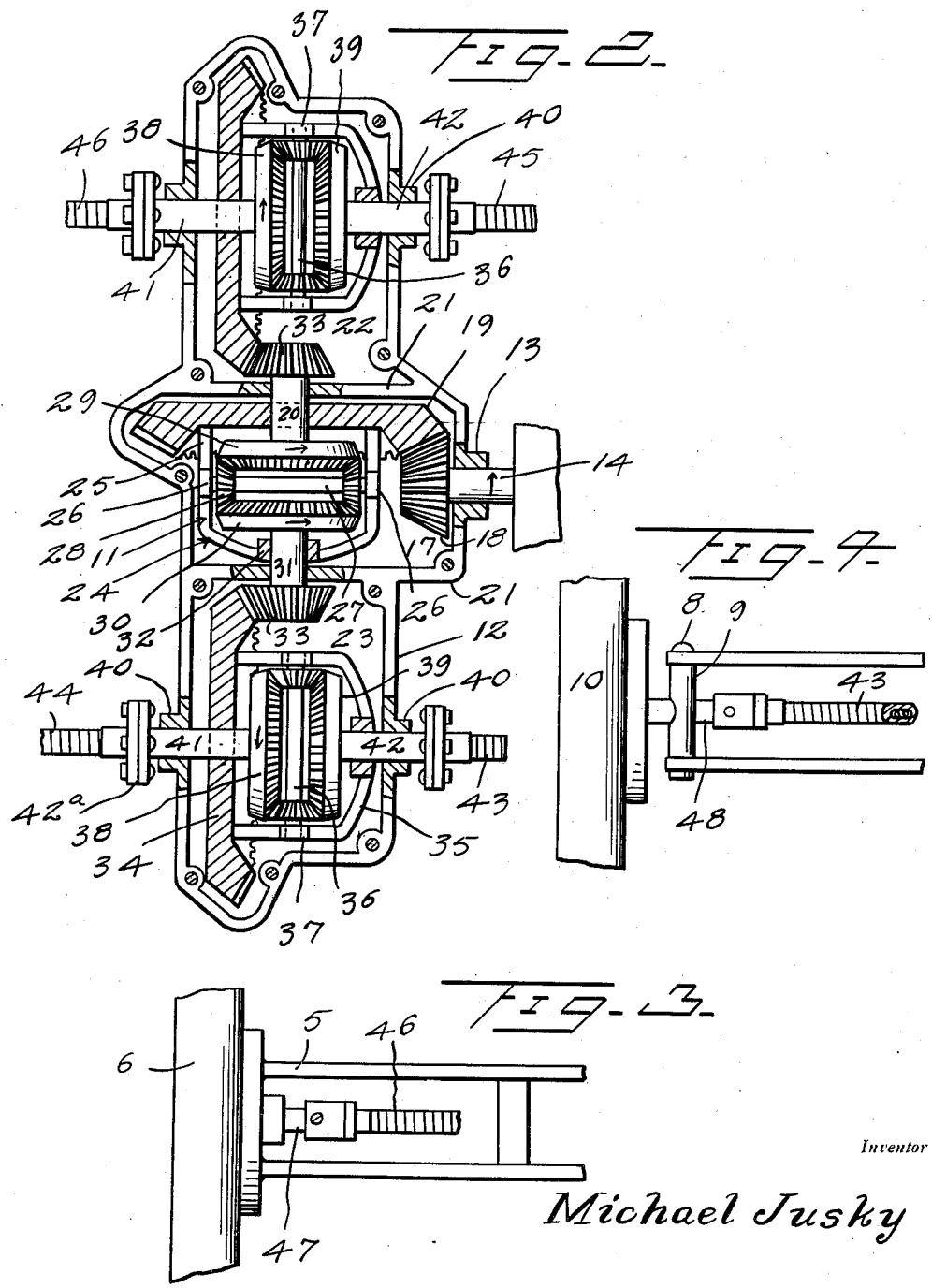

2,514,071

UNITED STATES PATENT OFFICE 2,514,071

DIFFERENTIAL FOR FOUR-WHEEL DRIVES

Michael Jusky, Manville, R. I.

Application February 14, 1947, Serial No. 728,668

4 Claims. (Cl. 74—710)

This invention relates to a novel construction of differential adapted for use on vehicles for permitting the driving of the four ground engaging wheels thereof, including the front steering wheels and by means of which flexible power is provided to permit turning of the vehicle.

A primary object of the invention is to provide a four wheel drive differential capable of being utilized in conjunction with steering wheels and which will permit all of the wheels to be mounted in a manner to be resiliently suspended with respect to the vehicle frame or chassis.

More particularly, it is an aim of the present invention to provide a differential including the equivalent of three interconnected differentials operating as a unit and by means of which the driving force on any particular wheel may be varied relatively to the other wheels of the vehicle to accommodate turning movements of the vehicle.

Various other objects and advantages of the invention will hereinafter become more fully apparent from the following description of the drawings, illustrating a preferred embodiment thereof, and wherein:

Figure 1 is a top plan view showing the differential connected by flexible shafts to the four wheels of a vehicle;

Figure 2 is an enlarged horizontal sectional view, partly in top plan of the differential;

Figure 3 is a side elevational view showing the connection of one of the driven flexible shafts of the differential to one of the rear wheels of the vehicle, and Figure 4 is a similar view showing the connection of one of the flexible shafts to a front wheel of the vehicle.

Referring more specifically to the drawings, 5 designates a rigid rear axle on the ends of which are journaled rear wheels 6, and 7 designates a front axle having king bolts 8 at the ends thereof for swivelly mounting king bolt frames 9 on which the front vehicle wheels 10 are journaled.

A differential, designated generally 11, includes a gear case or housing 12 having a bearing 13 intermediate of the ends thereof in which a portion of a propelling shaft 14 is journaled and which is adapted to be driven in a conventional manner from a vehicle engine, indicated generally at 15 through a conventional transmission 16.

The differential housing or gear case 12 includes a central compartment 17 which is provided with the bearing 13 and which contains a bevel gear or pinion 18 which is keyed to the propeller shaft 14 and which meshes with a ring gear 19, also contained in the compartment 17. The ring gear 19 is rotatably mounted on a shaft 20 which is journaled in an opening of one side wall 21 of the compartment 17 and which separates said compartment from one of the end compartments 22. The other side wall 21 of the compartment 17 similarly forms a partition between said compartment and the other end compartment 23 of the housing or gear case 12 and which corresponds to the compartment 22.

The ring gear 19 is provided with a frame or spider 24 which projects from the inner side thereof and which is provided with substantially parallel sides 25 each having a bearing 26. The bearings 26 align to journal a shaft 27 which extends therebetween. A pair of bevel pinions 28 are keyed to the shaft 27, between and adjacent the bearings 26, and each of said bevel gears or pinions 28 mesh with two bevel gears 29 and 30 which are disposed within the frame or spider 24 in opposed relationship to one another and at right angles to the bevel gears 28. The bevel gear 29 is keyed to one end of the shaft 20 and the bevel gear 30 is keyed to the corresponding end of a shaft 31 which is journaled in an opening of the other side wall 21 of the compartment 17 and which also extends rotatably through a bearing sleeve 32 of the arcuate outer portion of the frame or spider 24.

The remote ends of the shafts 20 and 31 extend into the end compartments 22 and 23, respectively, and are provided on said ends with complementary bevel gears or pinions 33 which are keyed thereto and each of which correspond to the bevel gear or pinion 18. Each of the compartments 22 and 23 contain a ring gear 34, corresponding to the ring gear 19, which has a frame or spider 35, corresponding to the spider 24, in which a shaft 36 is journaled similarly to the shaft 27 and shaft 36 carries bevel pinions 37 corresponding to the bevel pinions 28 and which mesh with bevel gears 38 and 39, corresponding to the bevel gears 29 and 30 and which are contained in the spider or frame 35 thereof.

Each of the compartments 22 and 23 is provided with aligned bearings 40 in the front and rear walls thereof. A shaft 41 is journaled in the rear wall bearing 40 and extends rotatably through the gear 34 and is keyed to its associated bevel gear 38. A shaft 42 extends through each front wall bearing 40 and rotatably through the intermediate outer frame or spider portion and is keyed to its complementary bevel gear 39. The shafts 41 and 42 are provided at their outer ends and externally of the housing 12 with coupling units 42a each including a pair of detachable sections which are bolted or otherwise connected together and one of which sections is connected fixedly to its associated shaft 41 or 42 and the other of which section is secured to an end of a flexible shaft.

As seen in Figure 1, one of said flexible shafts 43 extends from the left front wheel 10 and is connected to the shaft 42 which is journaled in the compartment 23 and another flexible shaft 44 extends from the right rear wheel 6 and is connected to the shaft 41 of the compartment 23. A flexible shaft 45, which crosses the shaft 43, extends from the right front wheel 10 and is connected to the shaft 42 of the compartment 22 and a flexible shaft 46 extends from the shaft 41 of compartment 22 and is connected to the left rear wheel.

As best seen in Figure 3, each of the rear wheels 6 is provided with an inwardly extending stub axle 47 which is ekeyed thereto and journaled in the axle 5, said stub axles 47 being connected to complementary ends of the flexible shafts 44 and 46 to form a driving connections therewith. Ae seen in Figure 4, each of the front wheels 10 is provided with a stub axle 48 which is keyed thereto and which extends inwardly rotatably through the king pin frame or bracket 9 of said wheel, said stub axles 48 being connected to complementary ends of the flexible shafts 43 and 45.

Assuming that the propeller shaft 14 is driven in the direction as indicated by the arrow in Figure 2, the ring gear 19 and its spider or frame 24 will be driven in a clockwise direction looking from bottom to top of Figure 2 for turning the bevel gears 29 and 30 in the directions as indicated by the arrows of Figure 2, and which are applied thereto, for driving the shafts 20 and 31 in the same direction and likewise the pinions 33. This will cause the ring gears 34 and the spiders 35 thereof to be rotated and to rotate the bevel gears 38 and 39 in the directions as indicated by the arrows on the bevel gears 38, so that the ring gear 34 of the compartment 22 will be revolving in a clockwise direction, looking from front to rear of Figure 2 while the ring gear 34 of the compartment 23 will be revolving in counterclockwise direction, as viewed from the front of Figure 2. This will cause the flexible shafts 43, 44, 45 and 46 to be turned in the same direction as the ring gears 34 with which they are associated for driving all of the ground wheels in a direction for causing the vehicle to move forwardly as seen in Figure 1. Assuming that the front steering wheels 10 are turned for making a right-hand turn, as seen in Figure 1, this will require that the left front wheel and left rear wheel travel greater distances in executing the turn than the right front and rear wheels and the right rear wheel will travel a lesser distance than the right front wheel and the left rear wheel a distance less than the left front wheel. Accordingly, the shaft 41 connected to the flexible shaft 44 will revolve at the slowest speed so that the ring gear 34 thereon will turn relatively thereto and the pinions 37 thereof in traveling around the bevel gear 38 of said shaft 41 will be revolved for revolving the bevel gear 39, connected to the shafts 42 and 43 to be rotated at an increased speed to permit the left front wheel to revolve more rapidly. Likewise, the right front wheel will be driven at a slower speed causing the flexible shaft 45 and the shaft 42 of compartment 22, connected thereto, to drag so that the pinions 37 of the ring gear 34 of compartment 22 will revolve relatively to said bevel gear 39 for rotating the bevel gear 38, connected to the shafts 41 and 46 at an increased speed in order that the left rear wheel 6 will turn more rapidly than the right front wheel 10. Any variation in the relative speed of rotation of the two ring gears 34 will be accommodated in a conventional manner by either the shafts 20 or 31 being caused to turn at variable speeds, the shaft that is caused to drag functioning to cause the other shaft to be speeded up through the operation of the pinions 28 riding over the bevel gear of the dragging shaft for driving the bevel gear of the other shaft at an increased speed.

Obviously, with the use of the flexible shafts each of the wheels 6 and 10 may be spring suspended with respect to its axle if desired and any conventional form of steering mechanism may be utilized for turning the king pin brackets 9 for steering the wheels 10.

If desired, the driving connections between the shafts 41 and 42 and the stub axles 47 and 48 could be provided by rigid shafts having universal joints at the ends thereof. Various other modifications and changes are likewise contemplated and may obviously be resorted to, without departing from the spirit or scope of the invention as hereinafter defined by the appended claims.

I claim as my invention:

1. In a differential for a front and rear wheel drive, a differential having an intermediate differential unit including a ring gear adapted to be driven from a vehicle engine propeller shaft and provided with a frame or spider mounted to rotate therewith and having a shaft journaled therein, two pinions keyed to said shaft, a pair of bevel gears disposed in said spider and each meshing with both pinions, shafts keyed to said bevel gears and extending outwardly therefrom, one of said shafts extending rotatably through the ring gear and the other shaft extending rotatably through said spider or frame, a bevel gear keyed to the outer end of each of said shafts, and a differential unit corresponding to the first mentioned differential unit and disposed at each side thereof, one of said differential units being driven by each of said last mentioned bevel gears, and the shafts of said last mentioned differential units being connected to front and rear wheels of the vehicle, one shaft of each of said last mentioned differential units being connected to a front wheel at one side of the vehicle and the other shaft of said differential unit being connected to the rear wheel at the other side of the vehicle.

2. In a differential for driving the front and rear wheels of a vehicle, three differential units each including a driven ring gear having a spider rotatable therewith, bevel pinions rotatably mounted in each spider, two bevel gears rotatably mounted in each spider and in mesh with the bevel pinions for rotation with, or relatively to, the ring gear and spider, one of said differential units being interposed between the other two units and the bevel gears thereof having shafts provided with pinions for driving the ring gears of the other two differential units, and the bevel gears of each of the last mentioned differential units being connected by shafts to front and rear wheels of the vehicle, one of the bevel gears of each of the last mentioned differential units being connected to a rear wheel of the vehicle and the other bevel gear of said unit being connected to the front wheel on the other side of the vehicle.

3. A differential as in claim 2, the bevel gears of the outer differential units being connected by shafts having flexible portions to the ground wheels of the vehicle.

4. In a differential for driving the front and rear wheels of a vehicle, said differential including three differential units including an intermediate differential unit adapted to be driven by the propeller shaft of a vehicle engine and outer differential units, disposed at right angles to said intermediate differential unit and flexibly driven thereby, and each of said outer differential units having opposed driven flexible shafts one of which is connected to a rear wheel of the vehicle and the other of which is connected to a front wheel thereof and at the opposite side of the vehicle.

MICHAEL JUSKY.

REFERENCES CITED

The following references are of record in the file of this patent:

UNITED STATES PATENTS

| Number | Name | Date |
|---|---|---|
| 652,949 | Cotta | July 3, 1900 |
| 820,709 | Durkee | May 15, 1906 |
| 1,074,341 | Avery | Sept. 30, 1913 |
| 1,198,983 | Winsor | Sept. 19, 1916 |
| 1,468,338 | Nyman | Sept. 18, 1923 |
| 1,686,431 | Nyman | Oct. 2, 1928 |
| 2,165,461 | Driesbach | July 11, 1939 |